United States Patent
Hu

(10) Patent No.: US 6,591,375 B1
(45) Date of Patent: Jul. 8, 2003

(54) RF TRANSMITTER FAULT AND DATA MONITORING, RECORDING AND ACCESSING SYSTEM

(75) Inventor: Zhiqun Hu, Middletown, OH (US)

(73) Assignee: Harris Corporation, Melbourne, FL (US)

( * ) Notice: Subject to any disclaimer, the term of this patent is extended or adjusted under 35 U.S.C. 154(b) by 568 days.

(21) Appl. No.: 09/608,728

(22) Filed: Jun. 30, 2000

(51) Int. Cl.[7] ............................. G06F 11/00; H04L 1/22
(52) U.S. Cl. ............................................. 714/25; 710/15
(58) Field of Search .......................... 714/25, 26, 27, 714/31, 32, 39, 47, 56, 46, 45; 710/15, 17, 18, 19

(56) References Cited

U.S. PATENT DOCUMENTS

| | | | | |
|---|---|---|---|---|
| 4,274,156 A | * | 6/1981 | Trefney | 455/115 |
| 4,463,434 A | * | 7/1984 | Haylett et al. | 364/507 |
| 5,513,185 A | * | 4/1996 | Schmidt | 371/5.5 |
| 5,784,547 A | * | 7/1998 | Dittmar et al. | 395/182.02 |
| 6,072,299 A | * | 6/2000 | Kurle et al. | 320/112 |
| 6,128,017 A | * | 10/2000 | Alimpich et al. | 345/347 |
| 6,438,462 B1 | * | 8/2002 | Hanf et al. | 700/297 |

* cited by examiner

Primary Examiner—Nadeem Iqbal
(74) Attorney, Agent, or Firm—Tarolli, Sundheim, Covell & Tummino L.L.P.

(57) ABSTRACT

The fault status of various components of an RF transmitter is monitored and recorded. A plurality of ports each receive an indication of an active or an inactive fault status from an associated one of a plurality of monitored the components. A multi-bit fault status structure is provided with each bit being associated with one of the monitored components and having a binary value representative of either an active fault status or an inactive fault status of the associated one of the monitored components. A micro-controller is programmed so that it determines whether any of the fault status indications have been changed from being an inactive status to an active status. If so, for each the monitored component, it sets the corresponding bit in the fault status structure to an active fault indication. If not, it resets the corresponding bit in the fault status structure to an inactive fault indication. The micro-controller is further programmed so that it provides a fault log that contains a record of the faults.

23 Claims, 7 Drawing Sheets

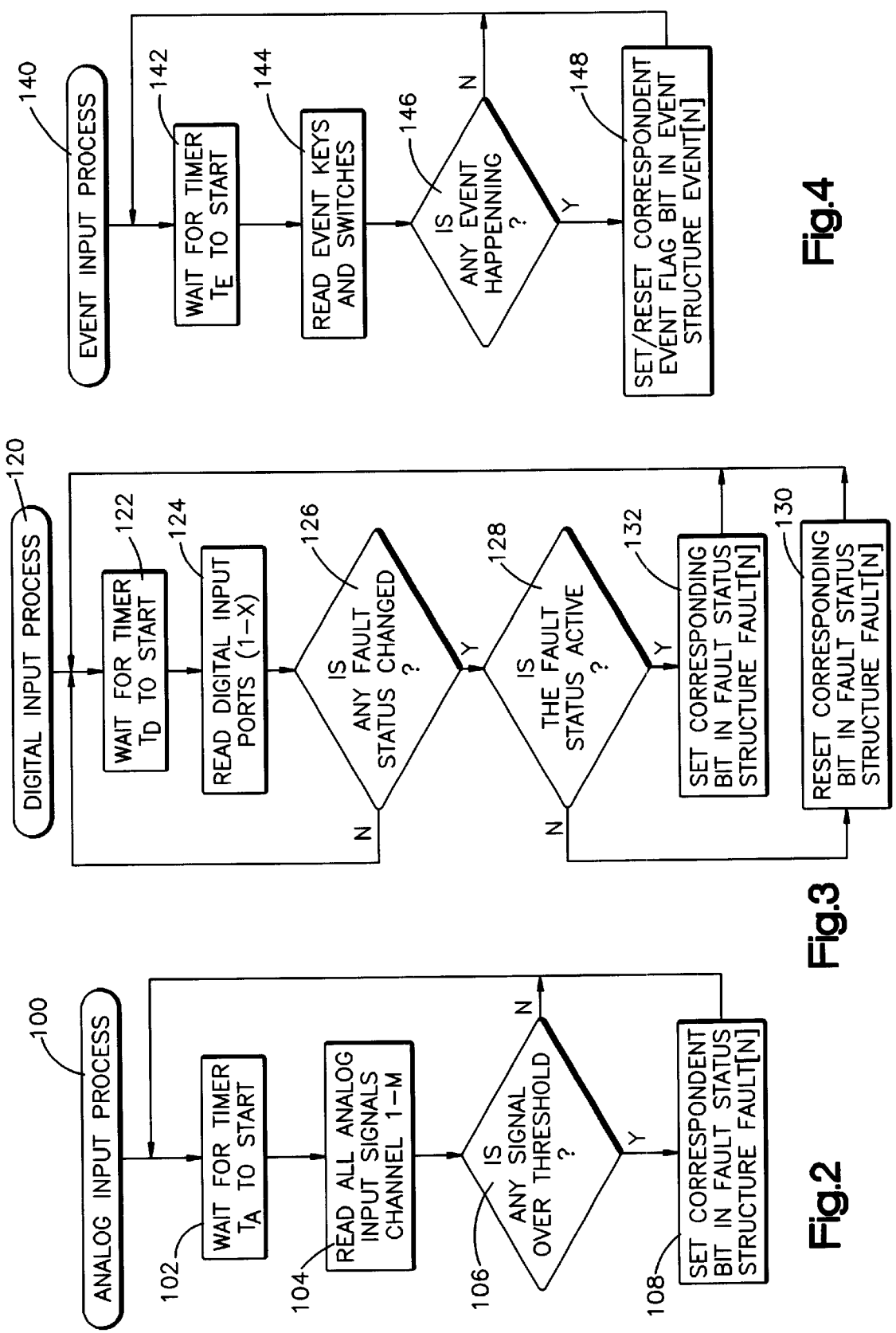

| | | |
|---|---|---|
| 1 | N, N-1 | TIME INSTANCES |
| 2 | i | CURRENT FAULT IDENTIFIER (BIT INDEX IN FAULT STATUS STRUCTURE) |
| 3 | j | CURRENT RECORD INDEX OF FAULT LOG (LATEST FAULT SEQUENCE NUMBER) |
| 4 | k | A FAULT LOG RECORD INDEX (THE RECORD HAS MATCHED FAULT IDENTIFIER WITH CURRENT FAULT ID) |
| 5 | FAULTVAR | VARIED FAULT STATUS |
| 6 | FAULT[N] | CURRENT FAULT STATUS STRUCTURE |
| 7 | FAULT[N-1] | PREVIOUS FAULT STATUS STRUCTURE |
| 8 | FAULTLOG | FAULT LOG STRUCTURE |
| 9 | FAULTLOG[j].ID | IDENTIFIER OF THE FAULT IN RECORD j OF FAULT LOG |
| 10 | FAULTLOG[j].STATUS | STATUS OF THE FAULT IN RECORD j OF FAULT LOG |
| 11 | FAULTLOG[j].TIME-OCCURED | TIME-OCCURED OF THE FAULT IN RECORD j OF FAULT LOG |
| 12 | FAULTLOG[j].TIME-CLEARED | TIME-CLEARED OF THE FAULT IN RECORD j OF FAULT LOG |
| 13 | RTC | REAL TIME CLOCK DATA |
| 14 | XOR | LOGIC XOR (EXCLUSIVE OR) OPERATION |
| 15 | XOR | LOGIC MODULAR OPERATION |

Fig.5

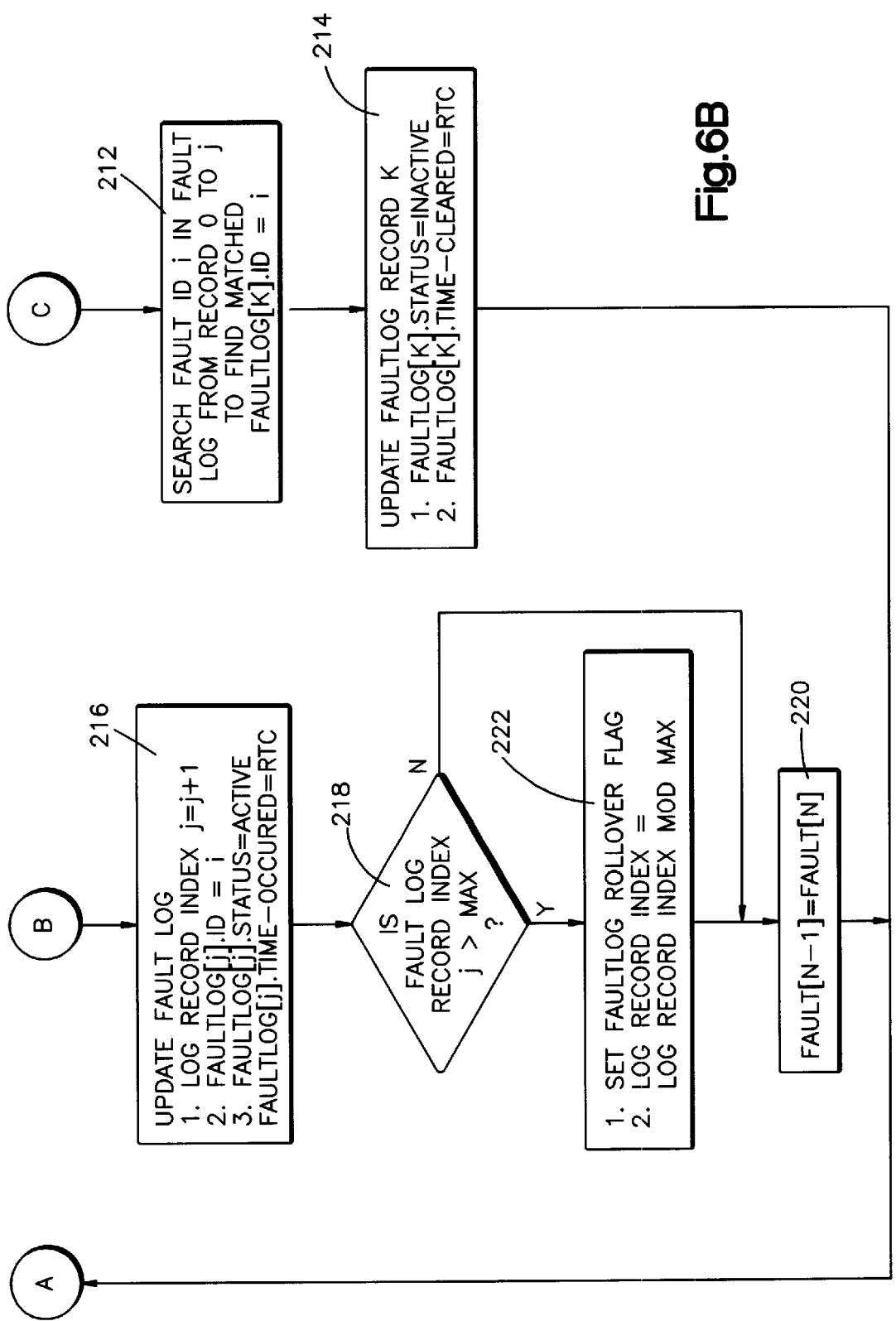

RF TRANSMITTER FAULT AND DATA MONITORING, RECORDING AND ACCESSING SYSTEM

TECHNICAL FIELD

The present invention is directed to RF transmitters and, more particularly, to monitoring and recording the fault status of various components of such a transmitter.

BACKGROUND OF THE INVENTION

RF transmitters include AM, FM and TV transmitters and such transmitters typically include a group of RF amplifiers, power supplies with a plurality of components that may fail during operation. Consequently, it is important to monitor these components to determine the fault status thereof as being either active or inactive (fault condition or a no-fault condition). The components to be monitored frequently include a plurality of amplifiers each of which may have an over current fault status condition, or interlocks which may have a fault status in the event of an open door condition. Also, events should be monitored, such as whether an interlock fail safe is open or whether the transmitter ON push button has been pressed. In addition to the fault and the event conditions noted above it may be desirable to monitor various signals, such as analog signals to determine whether they are of a value below or above certain threshold values. The foregoing and other components, events and signal conditions may need to be monitored.

It is desirable that the monitoring of the above be accompanied by recording (or logging) to provide a record or "fault log" that contains important information, such as fault type (fault description), fault status, fault occurred time, and fault-cleared time. This monitoring and recording should take place periodically or iteratively and the fault log should be accessible to an operator as by providing a display or a printed copy.

SUMMARY OF THE INVENTION

The present invention provides for monitoring and recording the fault status of various components of an RF transmitter in real time. The apparatus includes a plurality of ports that each receive an indication of an active or inactive fault status from an associated one of a plurality of monitored components. A multi-bit fault status structure is provided with each bit being associated with one of the monitored components. Each bit has a binary value representative of either an active fault status or an inactive fault status of the associated one of the monitored components. A micro-controller is programmed in such a manner that it determines whether any of the fault status indications have been changed from an inactive status to an active status and if so, then for each monitored component, it sets the corresponding bit in the fault status structure to an active fault indication. If not, it resets the corresponding bit in the fault status structure to an inactive fault indication. The micro-controller is also programmed in such a manner that for each iteration it provides a fault log.

In accordance with another aspect of the present invention, a plurality of event ports are provided each for receiving an active or inactive event status from associated one of a plurality of monitored events taking place in the transmitter. A multi-bit event status structure is provided with each bit being associated with one of the monitored events. Each bit has a binary value representative of either an active event status or an inactive event status of the associated one of the monitored events. A micro-controller is programmed so that it determines whether any of the event status indications have been changed from being an inactive status to an active status, and if so, it sets the corresponding bit in the event status structure. If not, it resets the corresponding bit in the event status structure. The micro-controller is further programmed to provide an event log. The log is a record of events including, for example, the event type, the present status of the event as being active or inactive, the real time of event occurrence, and the real time that the event occurrence was cleared, if cleared.

In accordance with a still further aspect of the present invention a plurality of analog signal ports are provided that each receive an analog signal. A multi-bit fault status structure is provided with each bit being associated with one of the monitored signals and having a binary value representative of either an active fault status or inactive fault status of the associated one of the monitored signals. A micro-controller is programmed so that it determines whether any of the analog signals exceeds a threshold for that signal and if so, it sets the corresponding bit in the analog status structure to an active fault indication. The micro-controller is further programmed so that it provides an analog system fault log. The fault log contains, for example, the fault type, present status as being active or inactive, the real time of fault occurrence and the real time that the fault was cleared, if it was cleared.

In accordance with a still further aspect of the present invention, access is provided to the fault log as with a display device coupled to the micro-controller for providing video display of the fault log on the screen thereof or by means of a PC terminal coupled to the microcomputer and having a video display. The fault log display obtained from the microcomputer includes the fault sequence number, the fault type, the present status of the component, event or analog signal, the time of occurrence and the fault clearing time.

BRIEF DESCRIPTION OF THE DRAWINGS

The foregoing and other features of the present invention will become apparent to one skilled in the art to which the present invention relates upon consideration the following description of the invention with reference to the accompanying drawings, wherein:

FIG. 2 is a flow diagram of one routine involved in one aspect of the invention;

FIG. 3 is a flow diagram illustrating another routine involved in the invention;

FIG. 4 is a flow diagram illustrating another routine involved in the invention;

FIG. 5 is a graphical illustration of a chart which is helpful in understanding the invention;

FIG. 6A and FIG. 6B taken together is a flow diagram of another routine involved in the invention;

DESCRIPTION OF A PREFERRED EMBODIMENT

Reference is now made to the drawings and the showings are for purposes of illustrating a preferred embodiment of the invention only and not for purposes of limiting the same.

Figure 1:
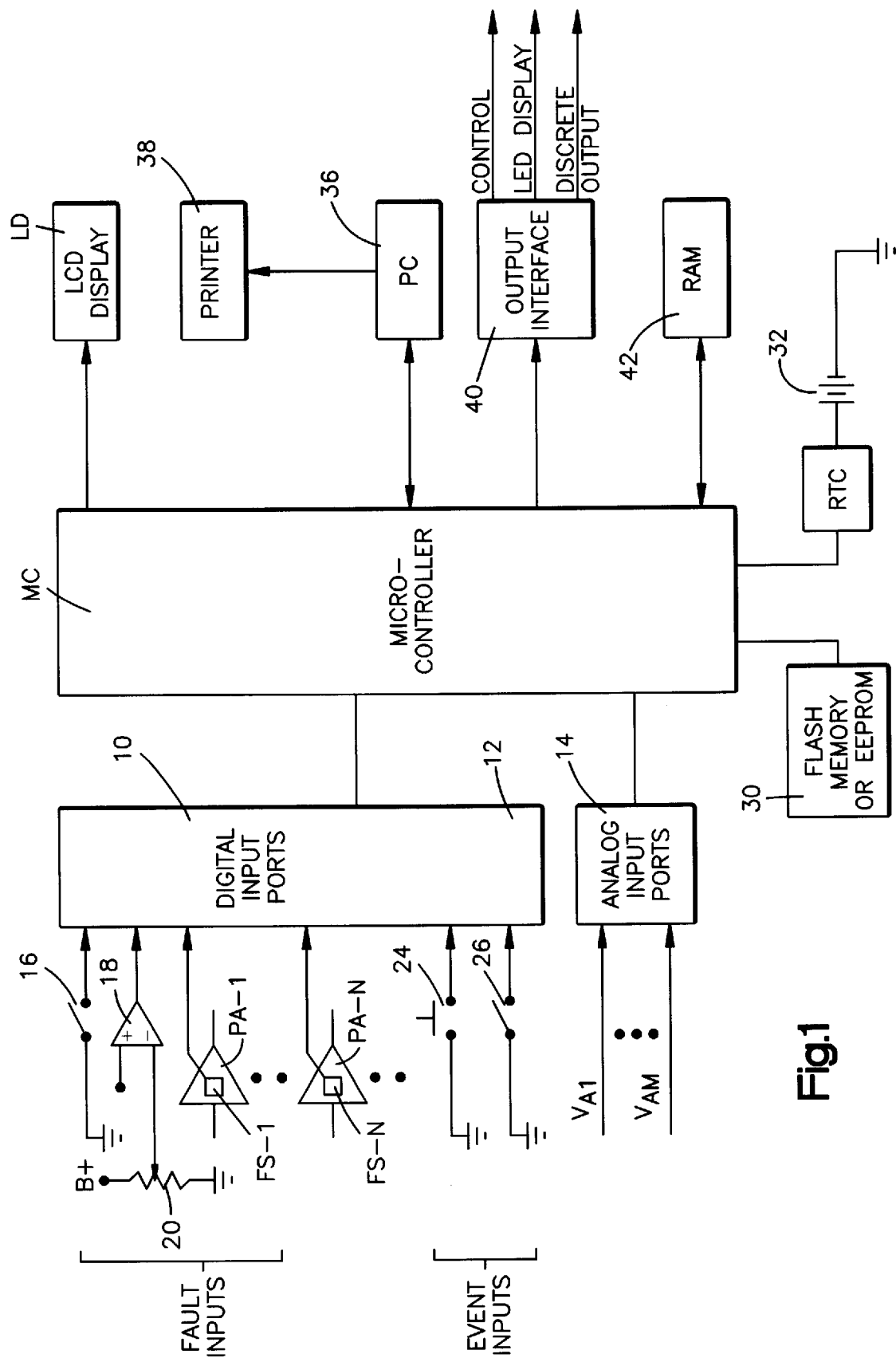
FIG. 1 is a schematic-block diagram illustration of one embodiment of the invention.

As illustrated in FIG. 1 there is provided a plurality of ports including digital input ports 10, event input ports 12, and analog input ports 14. These ports are connected to receive indications or signals of monitored components or events or analog signals as will be described below. The digital input ports each receive an indication of an active or an inactive fault status (a fault or a no-fault status) from an associated one of a plurality of monitored components. This takes place during each iteration of operation. The iterations may be spaced in time such as by 50–100 milliseconds apart. Digital input ports 10 are connected to various components of an RF transmitter. These include, for example, a port that receives a TTL signal from a fault sensor switch 16 which, when placed in an open condition, represents an interlock open door fault. This is a digital input since the door is either open or it is closed. A comparator 18 may be connected to another of the input ports and provides an indication of an active fault when the comparator indicates that the signal being monitored exceeds a threshold set by a potentiometer 20. The signal being monitored may be that representing a VSWR indication.

Such an RF transmitter frequently employs a plurality of power amplifiers, such as power amplifiers PA-1 through PA-N. In this example, each of the power amplifiers has an associated fault sensor FS-1 through FS-N which may be employed for sensing an amplifier fault condition, such as an over current condition. The fault sensors FS-1 through FS-N provide indications, such as a TTL positive voltage, to the digital input ports whenever the associated monitored power amplifier has faulted. It is contemplated that the foregoing and other components may be monitored during each iteration.

In addition to the fault status of the monitored components, the invention contemplates monitoring various events and providing an event log. These events may, for example, take the form whether an operator has pressed a transmitter ON button switch 24 or has opened a fail safe interlock switch 26. These are but two of a plurality of different events.

Additionally, it is contemplated that a data log will be recorded respecting various signals such as voltages $V_{A1}$ through $V_{AM}$ which are analog signals that may be applied to analog input ports 14. Whereas the digital input ports and the event input ports see binary level TTL signals, the analog input ports receive analog signals. The microcomputer MC that receives the analog signals from port 14, includes analog to digital converter circuitry for converting the analog signals into digital signals and then compares each with respective threshold levels to provide either a yes or no indication. This information is utilized in the same manner as the digital signals that are obtained from digital input ports 10 to provide fault status structures.

It is to be understood that the event signals, as well as the analog input signals, are processed in essentially the same fashion as the digital fault input signals. The discussion that follows immediately below is directed to the digital fault input signals.

The micro-controller MC may be considered as an embedded micro-controller and is provided with a memory 30 which may take the form of either a flash memory or an EEPROM for fault log storage. A real time clock (RTC) is provided with a backup battery 32. The clock is employed for recording the fault occurred time as well as the fault clearance time, as will be described below.

The fault log is a record of the faults and will be displayed as with an LCD display LD and may be accessed as with a PC terminal 36. The output may be provided as a video display and a hard copy may be obtained as with a printer 38. An output interface 40 is employed for purposes of providing control signals or LED display signals or providing discrete output signals. Additionally, data may be stored in a random access memory (RAM) 42.

The fault information is organized in three data structures: fault status structure, fault log structure, and fault type structure to contain different information for optimizing processing speed and reducing the size of data required to store dynamically.

1. Fault Status Structure

System faults are organized as a bit-field data array. The format of the data structure is an array with an element of 32-bit data structure. Every fault in the monitored system is correspondent to an individual bit in the structure, and the index of a bit in the bit-field structure is the identifier of the fault. All faults in a system have unique mapping relationships with the bit-field structure. The binary status of each individual bit will represent the fault status, either active or inactive. The size of the array is determined by total system faults, which could be in the range from 32 (or less) to up to a few hundreds.

2. Fault Type Structure

Fault type name and description is organized as constant data array, which has on-to one- correspondent relationship with fault status structure. The index number in the fault type structure is equal to the fault identifier, which is the index of a bit in the fault status structure (bit-field structure). Fault Type Structure is stored in the ROM and is used for display and to be indexed and searched through fault identifiers. Since there is no dynamically storage requirements for the fault type and description, the processing time and fault information storage time will be reduced to minimum.

3. Fault Log Structure

Fault log information is organized as a structure of data array. Every occurred fault has a record in the structure, the index of the record in the structure is a sequence number which is determined by fault-occur time. Each fault record has several elements to contain the fault type represented by a fault identifier, fault status, fault-occurred time and fault-clear time. All faults have the same data format. The fault log length (maximum faults could be put into the log, note: the same fault could be logged in many times) should be determined by the nature of the system (for the case the fault log length is 100). The fault log is stored into a non-volatile memory whenever the fault log information is changed, thus the power fail will not cause any fault data loss. A circular buffer algorithm is designed to handle the cases at which the fault number is more than fault log length, which will roll over the fault log by replace the oldest fault with the newly occurred fault.

The fault log system consists of three separated processes. First is fault process, which dynamically changes the status information in the fault status structure, based on the operational condition of the system. Second is fault-logging process, which updates the fault log based on the changes of fault status. Third is fault log access, which provides the convenient means for man-machine interface to check, and display log.

1. Fault Process

Fault processing task will dynamically monitor fault conditions in a system, it will set or reset the correspondent bit of the fault identifier in the fault status structure through the real time data acquisition process (including both analog and digital signals). If a new fault occurs, the fault bit in the fault status structure will be set, else if a fault is turned into inactive, the bit will be reset.

2. Fault Logging Process

The fault-logging task will dynamically update the fault log based on the fault status. The logging process uses XOR algorithm to source only the changed information for the fault status. If a fault status is changed, the logging algorithm will search the fault through the fault status bit-filed structure to get the fault identifier. If the changed fault status is active, which means a new fault has just occurred, the fault identifier, fault status and time-occurred will be put into the log. If the status is changed into inactive, then it will search the fault identifier through the fault log to get the index number of the fault in the log and then put the updated fault status and time-clear into the log.

3. Fault Log Access

There are three ways to access fault log inside the embedded control/monitor system.

a. A LCD device.

b. A PC with MS Window95, 98, 2000 software. The hyper terminal software of MS Window could be used to connect the system (either direct connection or through a modem) to a PC for display without any proprietary software. A display task resided in embedded device (designed for MS Window hyper terminal VT100) will upload the fault log and display it on the PC monitor.

c. The fault log can be accessed by a remote control system with proprietary software through modem and it could be displayed through embedded Internet web server.

The micro-controller MC (FIG. 1) processes the digital, event and analog data to provide a fault log (and also an event log and an analog signal log). The fault log is accessible for display or as a hard copy. The fault log appears in section 1 of Table 1 below:

in the log instantly. And once the faults are more than maximum log record number, the fault log will be overwrite, the old faults will be by the new ones thus there will be no faults information loss.

2. XOR Operation

Here both A and B are same 4-bit input port inputs, A is the sample at time N, while B is the sample at Time N−1. Q is output.

TRUTH TABLE

| A | B | C |
|---|---|---|
| 0011 | 0011 | 0000 |
| 0001 | 0011 | 0010 |
| 1001 | 0011 | 1010 |
| 1010 | 1010 | 0000 |

3. Modular Operation $A = X$ MOD $Y$ (101 MOD 100=1)

The fault log includes for each fault the FAULT SEQUENCE NO., the FAULT TYPE, STATUS, TIME-OCCURRED, and TIME-CLEARED. The FAULT SEQUENCE NO. refers to the faults in the sequence which they occur. The FAULT TYPE refers to the type of fault, such as VSWR fault or power amplifier (PA) over current fault, and so forth. The STATUS refers to whether the fault is inactive (and thus it has been cleared) or the fault is active (and has not been cleared). The TIME-OCCURRED refers to the real time obtained from the real time clock RTC that the fault occurred and the TIME-CLEARED refers to the real time that the particular fault was cleared. It is to be noted in sequence number 1 the VSWR fault occurred and was later cleared and hence it's status is indicated as being inactive. However, the same fault occurred again as noted in sequence number 3 and was cleared and then for a third time the fault occurred in sequence number 4 and has been cleared. Thus a monitored component may have a fault and be subsequently cleared several times and this is all entered into the fault log (or event log or analog signal log).

The manner in which the data is obtained from the input ports and then processed to obtain the fault log (or event log or analog signal log) is described below with reference to the flow charts of FIGS. 2–10 which illustrate the manner in

TABLE 1

1. Display Format (display format shown on PC VT100)

| FAULT SEQ. NO. | FAULT TYPE | STATUS | TIME-OCCURRED | TIME-CLEARED |
|---|---|---|---|---|
| 1 | VSWR FAULT | INACTIVE | 13:23:45 May 07, 2000 | 13:24:01 May 07, 2000 |
| 2 | PA OVER CURRENT | ACTIVE | 13:23:45 May 07, 2000 | |
| 3 | CABLE INTERLOCK | INACTIVE | 13:23:45 May 07, 2000 | 13:24:01 May 07, 2000 |
| 4 | COOLING FAULT | ACTIVE | 13:23:45 May 07, 2000 | |
| 5 | AC MAIN FAULT | INACTIVE | 13:23:45 May 07, 2000 | 13:24:01 May 07, 2000 |
| 6 | EXCITER A FAULT | ACTIVE | 13:23:45 May 07, 2000 | |
| 7 | VSWR FAULT | INACTIVE | 14:23:40 May 07, 2000 | 14:24:01 May 07, 2000 |
| 8 | VSWR FAULT | INACTIVE | 14:33:41 May 07, 2000 | 14:34:01 May 07, 2000 |

Comment: Multiple faults could happen at the same time (within 50–100 ms range) and all of them will be logged in. For instance, the above faults 1–6 (sequence number 1 to 6), happens at 13:23:45 May 7, 2000, and all of them are stored which the micro-controller MC is programmed to accomplish the various functions herein.

Attention is now specifically directed to FIG. 2 which illustrates the flow diagram for the analog input process routine 100 that serves to obtain the analog signals from the analog input ports 14. This routine commences with step 102 during which the process waits for timer TA to start. The procedure then advances to step 104 during which the analog input signals $V_{A1}$-$V_{AM}$ are read.

The procedure then advances to step 106 during which a determination is made as to whether any of the analog input signals $V_{A1}$-$V_{AM}$ has exceeded an associated threshold for that signal. If not, the process returns to step 102. If a signal did exceed the threshold, then the correspondent bit in the fault status structure is set to indicate a fault condition (i.e., that bit is set to a binary "1" level). And this is accomplished in step 108. The procedure then returns to step 102.

Reference is now made to FIG. 3 which illustrates the digital input process 120 showing the manner in which the micro-controller MC process as the digital signals. This routine commences at step 122 during which the micro-controller waits for the timer $T_D$ to start. Then, the procedure advances to step 124 during which the data at the digital input ports 1-X is read. The procedure advances to step 126 during which a determination is made as to whether any fault status has changed. If not, the procedure returns to step 122. If a fault status has changed, the procedure advances to step 128.

In step 128, a determination is made as to whether a fault status for the port being considered has changed from an inactive status to an active status. If not, then the fault status is changed from an active status to an inactive status and the procedure advances to step 130 during which a corresponding bit in the fault status structure is reset (to a binary "0").

If in step 128 a determination resulted in an affirmative result, the procedure advances to step 132 during which the corresponding bit in the fault status structure is set (that is, it is set to a binary "1" level). Thereafter, the procedure returns to step 122.

Attention is now directed to FIG. 4 which illustrates the flow diagram for the event input process routine 140. This process commences with step 142 during which the micro-controller waits for the event timer $T_E$ to start. Thereafter, the process advances to step 144 during which the event keys and switches and the like are read at the event input port 12. The procedure then advances to step 146.

In step 146 a determination is made as to whether any of the monitored events is happening. If not, the procedure returns to step 142. If in step 146 a determination is made that an event is happening, then the procedure advances to step 148 during which the corresponding bit in the event structure is set if the event is happening or is reset if the event is no longer occurring and has been cleared.

Reference is now made to FIG. 5 which illustrates a chart showing 15 different abbreviations listed in the column on the left side followed by a column with the meaning of each on the right side of the chart. These abbreviations are employed in the algorithms noted in the flow diagrams of FIGS. 6–10 that follow.

Figure 6A:
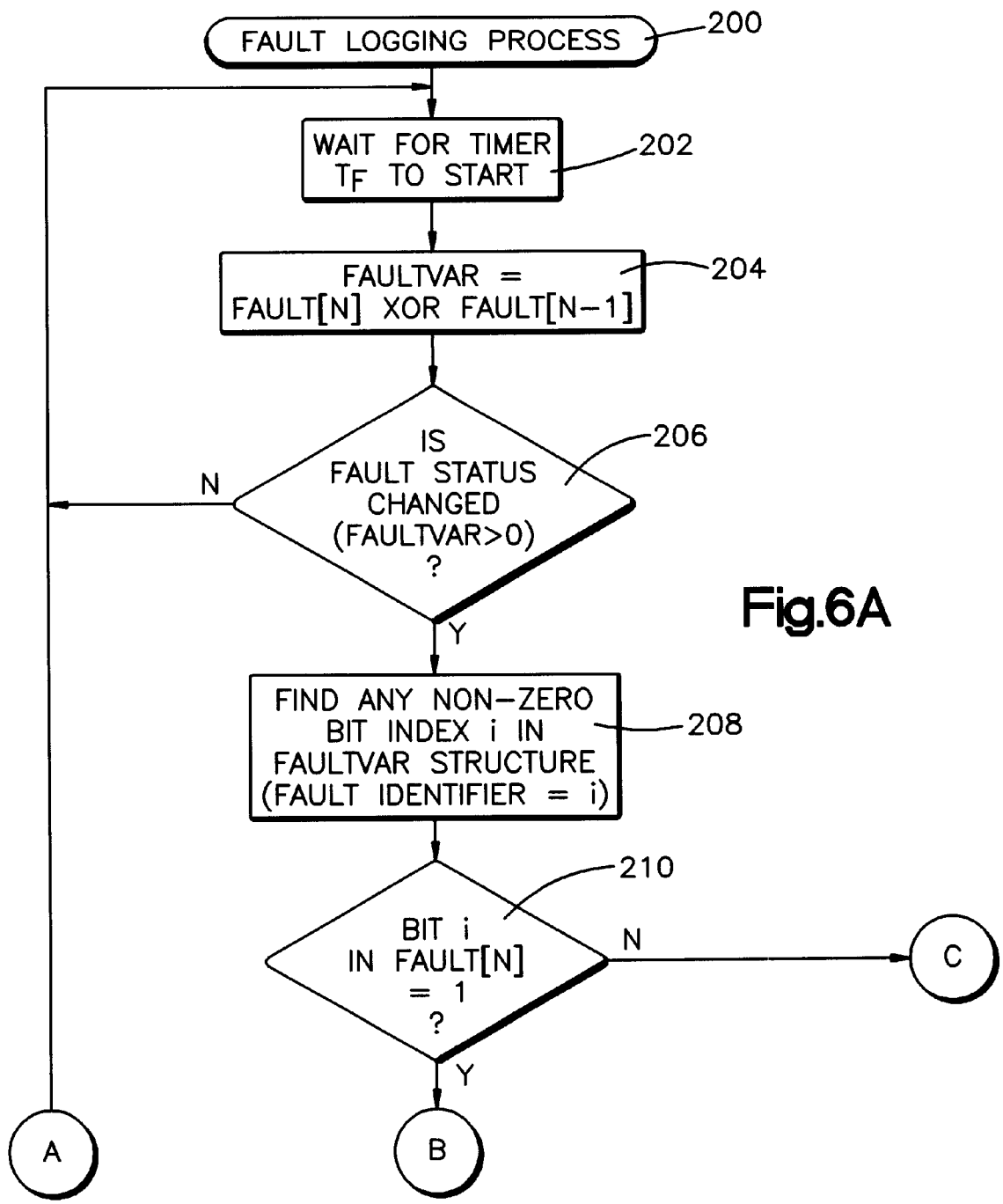

Reference is now made to FIG. 6 which is comprised of FIGS. 6A and 6B which illustrates the fault logging process routine 200. This process commences at step 202 wherein the process waits for the timer $T_F$ to start. The procedure then advances to step 204.

In step 204, the FAULTVAR is determined. That is, the procedure determines the varied fault status, which is obtained through logic XOR (exclusive OR) operation on current fault status structure FAULT[N] and previous fault status structure FAULT[N-1] (how many fault status changes have taken place). The procedure then advances to step 206.

In step 206, a determination is made as to whether the fault variations exceed zero. If not, the procedure returns to step 202. If the determination is yes, the procedure advances to step 208.

In step 208, the procedure finds any non-zero bit index i in the FAULTVAR structure, and then the procedure advances to step 210. In step 210 a determination is made as to whether bit i in current fault status structure FAULT[N] has been set to "1". If not, the procedure advances to step 212.

In step 212 the processor searches the identifier of the current fault in the fault log from record 0 to j to find matched, fault identifier in record K, and then the procedure advances to step 214.

In step 214, the process updates the fault log record K. As the status is inactive, the time cleared is entered as is shown for fault sequence numbers 1, 3, 5, 7, and 8 in Table 1. The procedure then returns to step 202.

If the determination in step 210 is yes, the procedure advances to step 216. In step 216, the fault log is updated. Thus, the fault sequence number is entered as well as the fault type, fault status (is active because the determination of bit i is that is has been set to "1"). The fault log is also updated as to the time (RTC) that the fault occurred. Refer to Table 1 for the format of the updated fault log. The procedure then advances to step 218.

In step 218 a determination is made as to whether the fault sequence number is greater than a given maximum number. If not, then the procedure advances to step 220 wherein the last fault is equal to the present fault. If the determination in step 218 is affirmative, the procedure advances to step 222 in which the fault log rollover flag is set and the log record index is equal to the log record index mod max.

Figure 7:
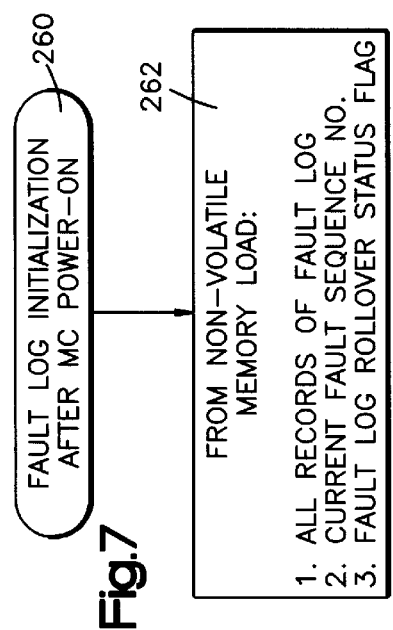
FIG. 7 is a flow diagram illustrating another routine involved in the invention.

Reference is now made to FIG. 7 which illustrates the fault log initialization routine 260 that takes place after the micro-controller MC is initially turned on. In this routine, which takes place in step 262, data is obtained from the non-volatile memory 30 and is loaded into RAM 42. This includes all records of fault log, current fault sequence number, and a fault log rollover status flag.

Figure 8:
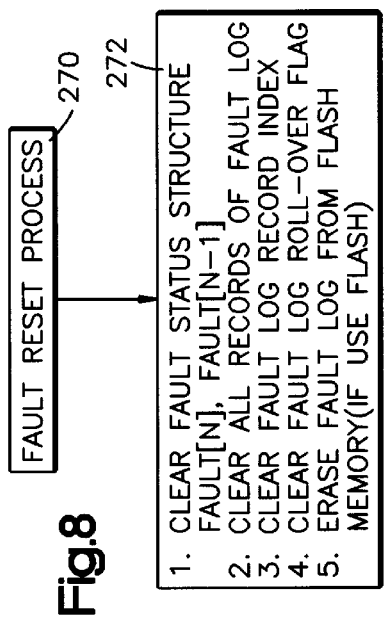
FIG. 8 is a flow diagram illustrating another routine involved in the invention.

Attention is now directed to FIG. 8 which illustrates the fault reset process 270. This process includes step 272 during which the memory is cleared of the fault status structure, all records of fault log, the fault log record index, the fault log rollover flag, as well as to erase the fault log from the flash memory (if this is used).

Figure 9:
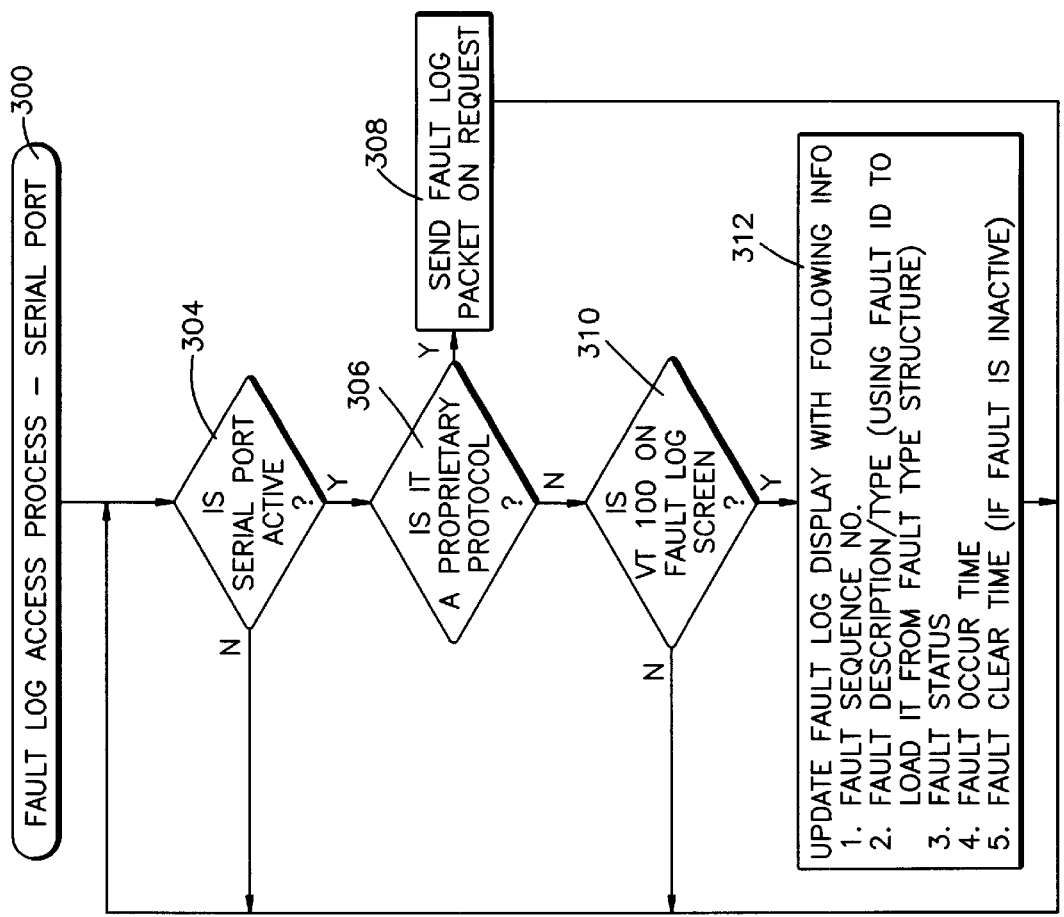
FIG. 9 is a flow diagram illustrating another routine involved in the invention; and, FIG. 10 is a flow diagram illustrating another routine involved in the invention.

Reference is now made to FIG. 9 which illustrates the fault log access process 300 serial port. This process commences with step 304.

In step 304 a determination is made as to whether the serial port is active. If not, the procedure loops back. If the determination is yes, the procedure advances to step 306 during which a determination is made as to whether the port is a proprietary protocol. If yes, the procedure advances to step 308. In step 308, the fault log packet (information in Table 1) is forwarded upon request. If not, the procedure advances to step 310.

In step 310 a determination is made as to whether the VT 100 is on the fault log screen. If not, the procedure returns to step 304. If the determination is yes, the procedure advances to step 312. During this step, the micro-controller sends the update fault display information to the requesting PC (PC terminal 36). This includes the data shown in the Table 1 commencing with the fault sequence number, the fault type, the fault status, the fault occurrence time and the fault clear time (if the fault is inactive). Thereafter the procedure returns to step 804.

Figure 10:
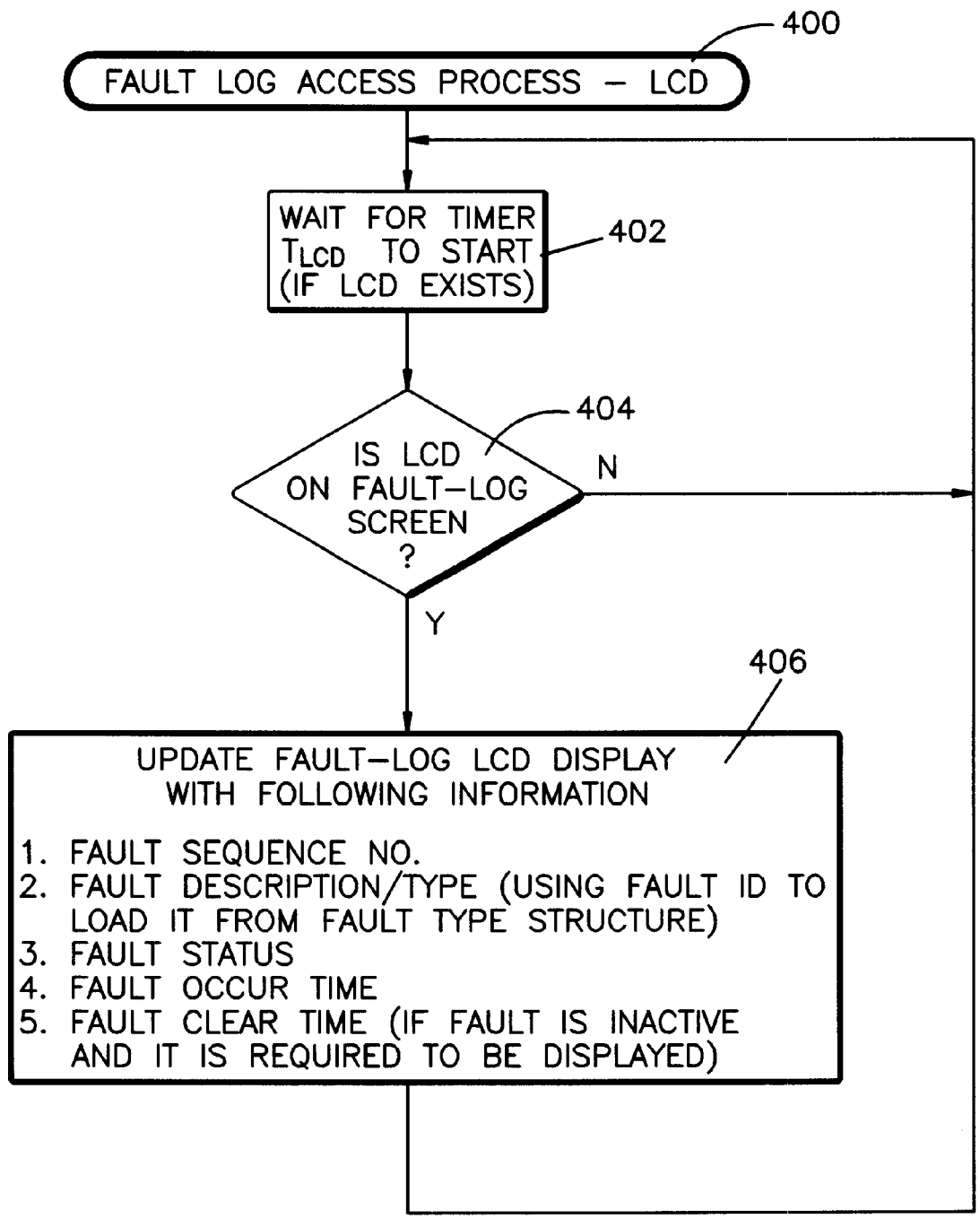

Attention is now directed to FIG. 10 which illustrates the fault log access process 400 for the LCD display LD.

This procedure commences with step 402 during which process waits for the timer $T_{LCD}$ to start (if the LCD display exists). The procedure then advances to step 404.

In step 404, a determination is made as to whether the fault log is on the screen of the terminal. If not, the procedure returns to step 402. If the determination is yes, the information for the display of the LCD is updated with the information as shown in Table 1. That is, the updated information will include the fault sequence number, the fault type, the fault status, the fault occurrence time, and the fault clearance time (if the fault is inactive and it is required to be displayed).

This Table only illustrates fault sequences 1–8, it being understood that some substantially larger number such as 100 fault sequences may be in the fault log. Section 2 illustrates the XOR operation which is self-explanatory as is the modular operation in section 3.

Although the invention has been described with respect to a preferred embodiment, it is to be appreciated that the various modifications may be made without departing from the spirit and scope of the appended claims.

Having described the invention I claim:

1. Apparatus for monitoring and recording the fault status of various components of an RF transmitter in real time, comprising:

a plurality of ports that each receive an indication of an active or an inactive fault status from an associated one of a plurality of monitored said components;

a multi-bit fault status structure with each bit being associated with one of said monitored components and having a binary value representative of either a said active fault status or a said inactive fault status of said associated one of said monitored components;

a micro-controller programmed so that it determines whether any of said fault status indications have been changed from being a said inactive status to a said active status and, if so, for each said monitored component it sets the corresponding bit in said fault status structure to an active fault indication and, if not, it resets said corresponding bit in said fault status structure to an inactive fault indication; and, wherein said micro-controller is further programmed so that it provides a fault log that contains a record of sequentially occurring faults.

2. Apparatus as set forth in claim 1 wherein said record includes for each fault the fault type and the present status as being active or inactive.

3. Apparatus as set forth in claim 2 wherein said record includes the real time of fault occurrence and the real time that the fault was cleared, if cleared.

4. Apparatus as set forth in claim 1 wherein said record includes for each fault the fault type, present status as being active or inactive, the real time of fault occurrence and the real time that the fault was cleared, if cleared, and it updates said fault log in accordance with the current fault status structure.

5. Apparatus as set forth in claim 1 including a display of said fault log.

6. Apparatus as set forth in claim 5 wherein said display is a video display.

7. Apparatus as set forth in claim 5 wherein said display is a printed display.

8. Apparatus as set forth in claim 7 wherein said record includes for each fault the fault type and the present status as being active or inactive.

9. Apparatus as set forth in claim 5 wherein said record includes for each fault the fault type, present status as being active or inactive, the real time of fault occurrence and the real time that the fault was cleared, if cleared.

10. Apparatus as set forth in claim 1 for additionally monitoring and recording the event status of various monitored events of said RF transmitter comprising:

a plurality of ports that each receive an indication of an active or inactive event status from an associated one of a plurality of monitored events.

11. Apparatus as set forth in claim 10 including a multi-bit event structure with each bit being associated with one of said monitored events and having a binary value representative of either a said active event status or a said inactive event status of said associated one of said monitored events.

12. Apparatus as set forth in claim 11 wherein said micro-controller is further programmed so that it determines whether any of said event status indications have been changed from being an said inactive status to a said active status and, if so, for each said monitored event it sets the corresponding bit in said event status structure to an active event indication and, if not, it resets said corresponding bit in said event status structure to an inactive event indication.

13. Apparatus as set forth in claim 12 wherein said micro-controller is further programmed to provide an event log that contains a record of the monitored events.

14. Apparatus as set forth in claim 10 wherein said record includes for each monitored event, the event type and the present status as being active or inactive.

15. Apparatus as set forth in claim 14 wherein said record includes the real time of event occurrence and the real time that the event was cleared.

16. Apparatus as set forth in claim 10 wherein said record includes for each event the event type, the present status as being active or inactive, the real time of event occurrence and the real time that the event was cleared, if cleared.

17. Apparatus as set forth in claim 10 including a display said event log.

18. Apparatus as set forth in claim 17 wherein said display is a video display.

19. Apparatus as set forth in claim 17 wherein said display is a printed display.

20. Apparatus for monitoring and recording the event status of various monitored events of an RF transmitter in real time, comprising:

a plurality of ports that each receive an indication of an active or an inactive event status from an associated one of a plurality of monitored events;

a multi-bit event structure with each bit being associated with one of said monitored events and having a binary value representative of either a said active event status or a said inactive event status of said associated one of said monitored events;

a micro-controller programmed so that it determines whether any of said event status indications have been changed from being a said inactive status to a said active status and, if so, for each said monitored event it sets the corresponding bit in said event status structure to an active event indication and, if not, it resets said corresponding bit in said event status structure to an inactive event indication; and, wherein said micro-controller is further programmed so that it provides an event log that contains a record of sequentially occurring events.

21. Apparatus as set forth in claim 20 wherein said record includes for each event the event type, present status as being active or inactive, the real time of event occurrence and the real time that the event was cleared, if cleared, and it updates said event log in accordance with the current event status structure.

22. Apparatus for monitoring and recording the analog fault status of various analog signal in an RF transmitter in real time, comprising:

a plurality of ports that respectively receive a plurality of analog signals;

a micro-controller programmed to receive said analog signals and compare each with a fault threshold level and provide an active fault status or an inactive fault status indication for each analog signal;

a multi-bit analog fault status structure with each bit being associated with one of said monitored analog signals and having a binary value representative of either a said active fault status or a said inactive fault status of said associated one of said analog signals;

a micro-controller programmed so that it determines whether any of said fault status indications have been changed from being a said inactive status to a said active status and, if so, for each said monitored analog signal it sets the corresponding bit in said analog fault status structure to an active fault indication and, if not, it resets said corresponding bit in said analog fault status structure to an inactive fault indication; and, wherein said micro-controller is further programmed so that it provides a fault log that contains a record of sequentially occurring faults.

23. Apparatus as set forth in claim 22 wherein said record includes for each fault the fault type, present status as being active or inactive, the real time of fault occurrence and the real time that the fault was cleared, if cleared, and it updates said fault log in accordance with the current fault status structure.

* * * * *